United States Patent
Lutz et al.

(10) Patent No.: US 11,841,701 B2
(45) Date of Patent: Dec. 12, 2023

(54) LOAD MANAGEMENT FOR DISPLAYING AN ALARM SIGNAL INDICATOR

(71) Applicant: Siemens Aktiengesellschaft, Munich (DE)

(72) Inventors: Benjamin Lutz, Pfinztal (DE); Georg Kluge, Linkenheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 69 days.

(21) Appl. No.: 17/575,832

(22) Filed: Jan. 14, 2022

(65) Prior Publication Data

US 2022/0229429 A1    Jul. 21, 2022

(30) Foreign Application Priority Data

Jan. 18, 2021  (EP) .................................. 21152062

(51) Int. Cl.
G05B 23/02    (2006.01)

(52) U.S. Cl.
CPC ....... *G05B 23/027* (2013.01); *G05B 23/0216* (2013.01); *G05B 23/0262* (2013.01); *G05B 23/0272* (2013.01)

(58) Field of Classification Search
CPC .............. G05B 23/027; G05B 23/0216; G05B 23/0262; G05B 23/0272; G05B 23/0267; G05B 2219/31472; G05B 19/0428; G05B 2219/24024
See application file for complete search history.

(56) References Cited

U.S. PATENT DOCUMENTS

2010/0211192 A1*  8/2010  Stluka ............... G05B 23/0272
                                                                    700/12

FOREIGN PATENT DOCUMENTS

| CN | 115471983 A * | 12/2022 | |
|----|---------------|---------|------|
| DE | 10044246 A1 * | 4/2002  | ......... H04L 41/0681 |
| EP | 3026518 A1 *  | 6/2016  | |

(Continued)

OTHER PUBLICATIONS

European Search Report dated Jul. 9, 2021 based on EP21152062 filed Jan. 18, 2021.

*Primary Examiner* — Kenneth M Lo
*Assistant Examiner* — Jonathan Michael Skrzycki
(74) *Attorney, Agent, or Firm* — Cozen O'Connor

(57) ABSTRACT

A method for visually displaying a facility mimic diagram of a technical facility which has an operator station server and an operator station client, wherein the method includes transferring the facility mimic diagram from the operator station server to the operator station client, where the facility mimic diagram includes an alarm signal indicator, communicating a duration for visually displaying the indicator, visually displaying the facility mimic diagram with the alarm signal indicator, informing the operator station client about an emergence of a new alarm signal in the management system via a message, determining a value an actual display time has to visually display the alarm signal indicator, determining whether a display time for the visual display of the alarm signal indicator with the new alarm signal would overshoot the value of the duration, limiting the visual display of the alarm signal indicator when the available duration is overshot.

18 Claims, 2 Drawing Sheets

(56) References Cited

FOREIGN PATENT DOCUMENTS

| EP | 3115855 | | 1/2017 | |
|----|---------|----|--------|----------|
| EP | 3115855 | A1 * | 1/2017 | |
| EP | 3680740 | | 7/2020 | |
| EP | 3736647 | | 11/2020 | |
| WO | WO-2017128712 | A1 * | 8/2017 | ............ H04L 41/06 |
| WO | 2020064712 | | 4/2020 | |

* cited by examiner

LOAD MANAGEMENT FOR DISPLAYING AN ALARM SIGNAL INDICATOR

BACKGROUND OF THE INVENTION

1. Field of the Invention

The invention relates to use of a management system, a method for visual display of a facility mimic diagram of a technical facility the management system for the technical facility, in particular a process or manufacturing facility, which has an operator station server and an operator station client, where for control and monitoring the operator station server is configured to transfer a facility mimic diagram of the technical facility to the operator station client, where the facility mimic diagram comprises an alarm signal indicator, and where the operator station client is configured to visually display the facility mimic diagram with the alarm signal indicator.

2. Description of the Related Art

For the control and monitoring of process-engineering facilities, management systems of the process-engineering facilities create symbolic facility mimic diagrams, where these diagrams display the process-engineering connections (in particular between the process objects of the process-engineering facilities) in an abstract manner.

Facility mimic diagrams are composed of static symbols (for example, pipes or rectangles), dynamized symbols (pipes with color change, rectangles with fill levels, which change as a function of process measured values), block symbols (for dynamized visualization of process-engineering process objects), complex controls (for example, trend indicators or event sequence indicators) and containers in which contents of independent and stand-alone sources can be visualized. These sources can be, for example. webcams, facility mimic diagrams of modular facility parts (what are known as "Package Units"), apps (for example, controller optimizers, KPI calculations) and the like.

The containers are implemented by different technologies. In modern, web-oriented management systems, what are known as iFrames can be used for this purpose, and these are applied, for example, in the Siemens Web Application Collaboration (SWAC) technology used by the company Siemens.

The above-mentioned complex controls (trend indicators, XY-graphs, event sequence indicators, SFC step sequences, CFC visualization, or batch) can also be embedded with the aid of containers in facility mimic diagrams because the underlying applications can thus be decoupled and distributed at the server in order to achieve a higher degree of robustness.

What is known as an "event sequence indicator" plays a central role in the context of alarm management in the control and monitoring of a (process-engineering) technical facility. Such an event sequence indicator is disclosed, for example, in WO 2020/064712 A1 and EP 3680740 A1. In an event sequence indicator, the (process-engineering) technical facility notifications which, as a rule, relate to operation of the facility, are visually presented to an operator. A notification is generally taken to mean a report of the incidence of an event, which represents a transition from a discrete state within the (process-engineering) technical facility into another discrete state. This makes it possible for the operator(s) to be informed as early as possible about the exact sequence or the result of their actions (the sequence of their requests) in the respective system context. Alarm signals (or alarms for short) are specific notifications which, as a rule, require an immediate reaction of the operator of the (process-engineering) technical facility.

Event sequence indicators with alarm signals in accordance with the prior art can reach their limits in the case of long-lasting volatility of alarm changes, high alarm emergence or sudden alarm emergence and often can no longer adhere to the time contingents available to them for visualization. This can lead to considerable losses in performance in the control and monitoring of the (process-engineering) technical facility through to failure of the control and monitoring.

SUMMARY OF THE INVENTION

It is an object of the invention to provide a management system for a technical facility, which can display an alarm signal indicator with a high level of availability.

This and other objects and advantages are achieved in accordance with the invention by a management system for a technical facility, in particular a manufacturing or process facility, use of a management system for operation of the technical facility, a method for visually displaying a facility mimic diagram of a technical facility, where the management system includes an operator station server that has a computer-implemented alarm signal service, which is configured to communicate to the operator station client, when transferring the facility mimic diagram with the alarm signal indicator, which duration the operator station client is allowed to expend to visually display the alarm signal indicator, and where the operator station client is configured to determine which value an actual display time has for the visual display of the alarm signal indicator, where the alarm signal service is also configured to inform the operator station client about an emergence of a new or updated alarm signal in the management system by way of a message, where the operator station client is configured to determine whether a display time for the visual display of the alarm signal indicator with the new or updated alarm signal would exceed the value of the duration, which the operator station client is allowed to expend for the visual display of the alarm signal indicator, and where the operator station client is also configured to limit the visual display of the alarm signal indicator when the available duration is overshot.

In the present context a management system means a computer-assisted technical system, which comprises functionalities for displaying, controlling and managing a technical system, such as a manufacturing or production facility. Apart from the operator station server and the operator station client, the management system can also comprise, for example, what are known as process- or manufacturing-related components, which serve to actuate actuators or sensors.

The technical facility can be a facility from the process industry such as a chemical, pharmaceutical, petrochemical facility or a facility from the foodstuffs and luxury food industries. Also incorporated herewith are any facilities from the production industry, factories in which, for example, cars or goods of all kinds are produced. Technical facilities, which are suitable for implementing the inventive method, can also come from the energy production sector. Wind turbines, solar facilities or power stations for energy production are likewise incorporated by the term technical facility.

In the present case an "operator station server" means a server, which centrally captures data from a control and monitoring system and, as a rule, alarm and measured value archives of a management system of a technical facility and makes it available to users. As a rule, the operator station server establishes a communications link to automation systems (such as an automation device) of the technical facility and passes data from the technical facility to what are known as "operator station clients", which serve to control and monitor the operation of the individual functional components of the technical facility.

The operator station server can itself have client functions in order to access the data (archives, messages, tags, variables) of other operator station servers. As a result, diagrams of operation of the technical facility on the operator station server can be combined with variables of other operator station servers (server-server communication). The operator station server can be, without being limited hereto, a SIMATIC PCS 7 Industrial Workstation Server belonging to SIEMENS.

The facility mimic diagram, which the operator station server transfers to the operator station client for visual display, is a control display conventionally used for management systems, which comprises graphic representations of individual elements of the technical facility and serves to display a status of the individual elements, of a (for example, process-engineering) connection between the elements or the like.

The facility mimic diagram comprises at least one alarm signal indicator. The alarm signal indicator can supply, for example, in a tabular list, an overview of alarm signals that have emerged in the management system. It is also referred to as an event sequence indicator.

When transferring the facility mimic diagram, the computer-implemented alarm signal service of the operator station server communicates to the operator station client the additional information as to which duration the operator station client is allowed to expend for the visual display of the facility mimic diagram. In other words, computer-implemented alarm signal service gives the operator station client a time budget that is available to the client for rendering of the facility mimic diagram. This time budget can have been defined in the engineering, in other words when developing an automation of the technical facility.

If a new or updated alarm signal (or a large number of alarm signals) now emerges in the management system, the alarm signal service of the operator station server cannot immediately transfer it to the operator station client but must firstly send a message to the operator station client, which informs the client about the emergence of the new or updated alarm signal. In response, the operator station client can calculate whether its time budget is sufficient for it to display the new alarm signal. For this, it checks whether the display time for the visual display of the alarm signal indicator with the new or updated alarm signal would overshoot the duration, which the operator station client is allowed to expend for the visual display of the alarm signal indicator.

If this is not the case, then the operator station client can retrieve the new or updated alarm signal from the operator station server and visually display it in the alarm signal indicator.

If the time budget would be overshot, then the operator station client is configured to limit the visual display of the alarm signal indicator. As a result, the operator station client can dynamically react to changing demands. A (temporary) failure of the display for control and monitoring can thus be effectively prevented, such that the technical facility can be controlled and monitored at any instant. These advantages primarily take effect with a long-lasting volatility of alarm changes, with a generally high emergence of alarms or with a sudden "plethora of alarms". In addition, the inventive management system is advantageously suitable to an increased extent for implementation on different hardware platforms, as are particularly employed when web-based management systems are used.

Preferably, the message, which can be transmitted by the alarm signal service to the operator station client, comprises information about a criticality of the alarm signal. Accordingly, in the case of the management system the limitation of the visual display of the alarm signal indicator can consist of only displaying alarm signals that have a particular criticality. In this case, the operator station client can firstly retrieve those alarm signals that have a criticality from the operator station server and visually display them. These alarm signals are thus treated with a higher priority. A measure of the criticality can be an alarm category of the alarm signals.

Within the framework of an advantageous embodiment of the invention, the message, which can be transmitted by the alarm signal service to the operator station client, can comprise information about an acknowledgement of the alarm signal that has possibly already occurred. Accordingly, the limitation of the visual display of the alarm signal indicator can consist of only displaying alarm signals that have not yet been acknowledged. If the alarm signals have already been acknowledged, in other words have been dealt with or processed by an operator of the technical facility, then, as a rule, these have a lower urgency and can be shelved in favor of other, more urgent alarm signals, therefore.

Alternatively or in addition, further criteria can be used to limit the visual display of the alarm signal indicator. For example, alarm signals that have previously been hidden for a particular reason (within the framework or what is known as "Alarm Shelving") can be ruled out. A sequence over time of the new or updated alarm signals, for example, can also be used as a criterion for the limitation of the visual display.

It is also an object of the invention to use the management system, which is configured as explained previously to operate a technical facility, in particular a process or manufacturing facility.

It is a further object of the invention, moreover, to provide a method for visually displaying a facility mimic diagram of a technical facility, in particular a process or manufacturing facility, which has an operator station server and an operator station client, where the facility mimic diagram comprises an alarm signal indicator, where the method comprises a) transferring the facility mimic diagram of the technical facility from the operator station server to the operator station client, wherein the facility mimic diagram comprises the alarm signal indicator, b) when transferring the facility mimic diagram with the alarm signal indicator, communicating a duration, which the operator station client is allowed to expend to visually display the alarm signal indicator, via a computer-implemented alarm signal service of the operator station server, c) visually displaying the facility mimic diagram with the alarm signal indicator by the operator station client, d) informing the operator station client about the emergence of a new or updated alarm signal in the management system via a message by the alarm signal service, e) determining via the operator station client which value an actual display time has for visually displaying the alarm signal indicator, f) determining via the operator station client whether a display time for the visual display of the alarm signal indicator with the new or updated alarm signal would overshoot the value of the duration, which the operator station client is allowed to apply for the visual display of the alarm signal indicator, g) limiting the visual display of the alarm signal indicator by the operator station client when the available duration is overshot.

Preferably, the message, which is transmitted by the alarm signal service in method step e to the operator station client, comprises information about a criticality of the alarm signal.

Particularly preferably, the message, which is transmitted by the alarm signal service in method step e to the operator station client, comprises information about an acknowledgement of the alarm signal that has possibly already occurred.

In accordance with the method of the invention, the limitation of the visual display of the alarm signal indicator can consist of only displaying alarm signals that have a particular criticality.

The limitation of the visual display of the alarm signal indicator can, as an alternative or in addition, also consist of only displaying alarm signals that have not yet been acknowledged.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which they are achieved will become clearer and more obvious in connection with the following description of an exemplary embodiment, which will be explained in more detail in connection with the drawings, in which.

DETAILED DESCRIPTION OF THE EXEMPLARY EMBODIMENTS

Figure 1:
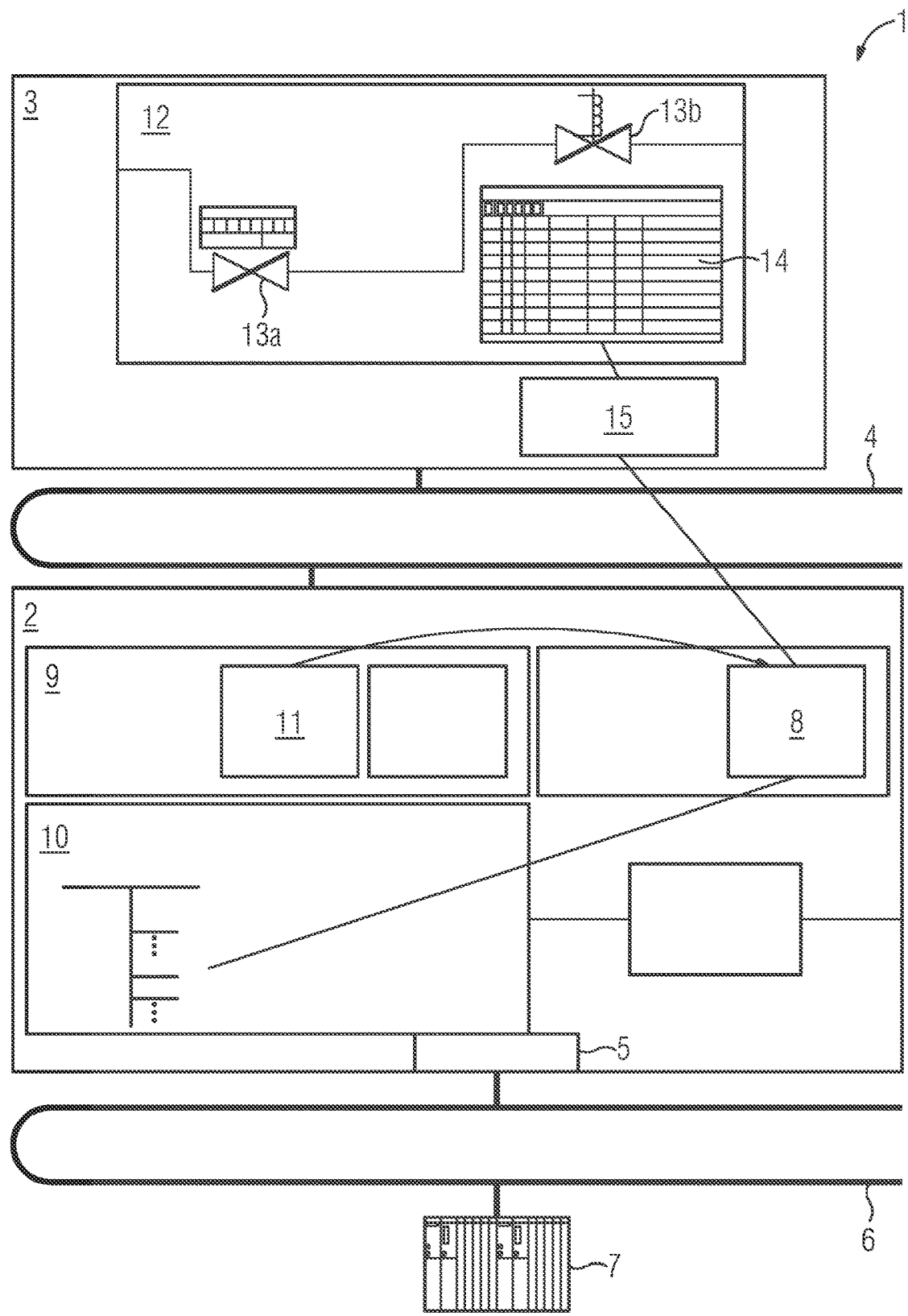
FIG. 1 is a schematic illustration of a portion of management system of a technical system in accordance with the invention.

FIG. 1 shows part of an inventive management system 1 of a technical facility configured as a process facility, i.e., as a process-engineering facility. The management system 1 comprises an operator station server 2 and an operator station client 3.

The operator station server 2 and the operator station client 3 are interconnected via a terminal bus 4 and optionally to further components (not shown) of the management system 1 such as a process data archive.

A user or an operator can access the operator station server 2 for the purpose of control and monitoring via the operator station client 3 via the terminal bus 4. The terminal bus 4 can be configured, for example, as an industrial Ethernet, without being limited thereto.

The operator station server 2 has a device interface 5, which is connected to a facility bus 6. The operator station server 2 can communicate via this device interface 5 with an automation device 7 and with optionally available further components of the process facility. The facility bus 6 can be configured, for example, as an industrial Ethernet, without being limited thereto. The automation device 7 can be connected to any number of subsystems (not shown).

An alarm signal service 8, a visualization service 9 and a process map 10 are implemented on the operator station server 2. From the visualization service 9, the alarm signal service 8 receives information 11 with respect to a facility mimic diagram, which is to be visually displayed (on a screen) by the operator station client 3 in accordance with automation project planning of the technical facility. Within the symbol representing the operator station client 3, FIG. 1 shows a facility mimic diagram 12 of this kind. FIG. 1 shows, by way of example, two interconnected symbols for valves 13a, 13b and an alarm signal indicator 14.

The sequence of the inventive method as described below is as follows: the alarm signal service 8 extracts from the information 11 the alarm signals, which form a part of this information. In addition, the alarm signal service 8 extracts from the information 11 a duration, which the operator station client 3 is allowed to expend for the visual display of the alarm signal indicator 14. This duration was previously defined by a project engineer of the technical facility within the framework of engineering/project planning of the automation of the technical facility. The operator station client 3 visually displays the facility mimic diagram 12 with the (initially empty) alarm signal indicator 14.

If an alarm signal now occurs in the management system 1, then this alarm signal is stored in the process map 10. The alarm signal service 8 is informed about the emergence of the new alarm signal or it monitors the process map 10 with regard to new or updated alarm signals.

The alarm signal service 8 then informs an alarm service 15 of the operator station client 3 about the emergence of the new alarm signal and communicates to it which criticality of the alarm signal, whether the alarm signal has already been acknowledged and whether the alarm signal has previously been hidden (alarm shelving). The alarm service 15 of the operator station client 3 then determines whether a display time for the visual display of the alarm signal indicator 14 with the new or updated alarm signal would overshoot the value of the duration, which the operator station client 3 is allowed to expend for the visual display of the alarm signal indicator. If this would be the case and the operator station client 3 would not take any countermeasures, then the operator station client 3 would reach its performance limits and fail, especially with a large number of alarm signals.

If the limit would not be overshot, then the alarm service 15 of the operator station client 3 actively retrieves the alarm signal(s) from the alarm signal service 8 of the operator station server 2.

If the time budget, in other words the duration, which the operator station client 3 is allowed to expend for the visual display of the alarm signal indicator 14, would be overshot by the newly added (or updated) alarm signal(s), then the alarm service 15 of the operator station client 3 limits the visual display because it retrieves only a fraction of the alarm signals from the operator station server 2. In the process, it can, for example, take into account a criticality of the alarm signals or the fact that an alarm signal has already been acknowledged, for the limitation. The correspondingly excepted alarm signals are then (for the time being) not retrieved from the operator station server 2. A plurality of limitation rules can also be applied simultaneously or one after the other.

The alarm signals, which are initially not retrieved, can be reloaded at a later instant (if the operator station client 3 no longer threatens to overshoot its performance limits).

Overall, the disclosed embodiments of the invention can make a contribution to a higher level of availability of the technical facility, specifically when a web-based management system is used.

Figure 2:
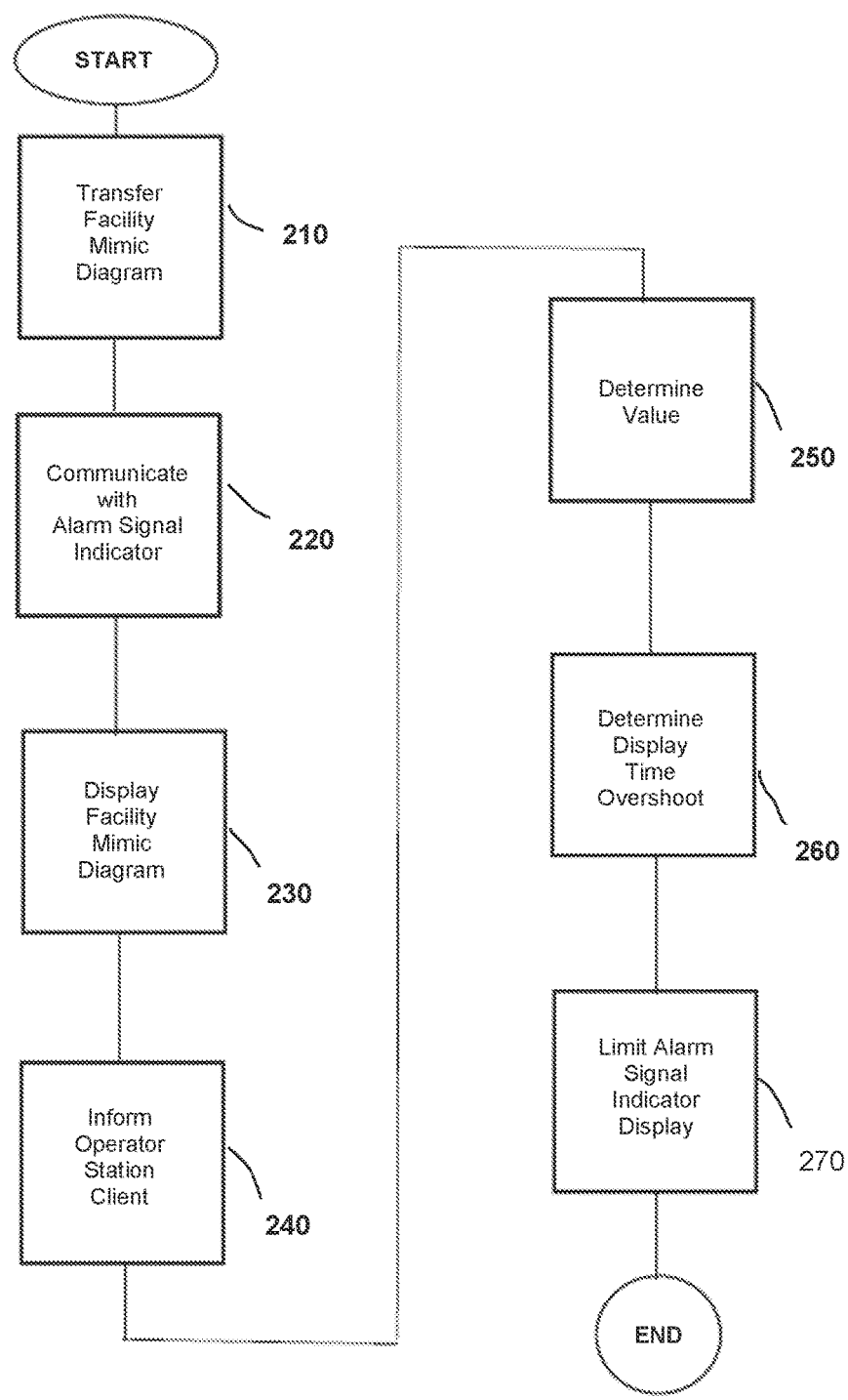
FIG. 2 is a flowchart of the method in accordance with the invention.

FIG. 2 is a flowchart of the method for visually displaying a facility mimic diagram 11, 12 of a technical facility including an operator station server 2 and an operator station client 3. The method comprises a) transferring the facility mimic diagram 11, 12 of the technical facility from the operator station server 2 to the operator station client 3, the facility mimic diagram 1, 12 comprising an alarm signal indicator 14, as indicated in step 210.

Next, b) a duration which the operator station client 3 is allowed to expend for visual display of the alarm signal indicator 14, when transferring the facility mimic diagram 11, 12 with the alarm signal indicator 14, is communicated via a computer-implemented alarm signal service 8 of the operator station server 2, as indicated in step 220.

Next, c) the facility mimic diagram 11, 12 is visually displayed with the alarm signal indicator 14 by the operator station client 3, as indicated in step 230.

Next, d) the operator station client 3 is informed about the emergence of a new or updated alarm signal in the management system 1 via a message by the alarm signal service 8, as indicated in step 240.

Next, e) determining the value which an actual display time has for the visual display of the alarm signal indicator 14 is determined via the operator station client 3, as indicated in step 250.

Next, f) whether a display time for the visual display of the alarm signal indicator 14 with the new or updated alarm signal would overshoot the value of the duration which the operator station client 3 is allowed to apply for the visual display of the alarm signal indicator 14 is determined via the operator station client 3, as indicated in step 260.

Next, g) the visual display of the alarm signal indicator 14 is limited by the operator station client 3 when the available duration is overshot, as indicated in step 270.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A management system for a technical facility, comprising:
  an operator station server; and
  an operator station client;
  wherein for control and monitoring the operator station server is configured to transfer a facility mimic diagram of the technical facility to the operator station client;
  wherein the facility mimic diagram comprises an alarm signal indicator;
  wherein the operator station client is configured to visually display the facility mimic diagram with the alarm signal indicator;
  wherein the operator station server includes a computer-implemented alarm signal service, which is configured to communicate to the operator station client, when transferring the facility mimic diagram with the alarm signal indicator, which duration the operator station client is allowed to expend for the visual display of the alarm signal indicator;
  wherein the operator station client is configured to determine which value an actual display time has for the visual display of the alarm signal indicator;
  wherein the alarm signal service is configured to inform the operator station client about an emergence of a new or updated alarm signal in the management system via a message,
  wherein the operator station client is further configured to determine whether a display time for the visual display of the alarm signal indicator with the new or updated alarm signal would overshoot a value of the duration which the operator station client is allowed to expend for the visual display of the alarm signal indicator; and
  wherein the operator station client is further configured to limit the visual display of the alarm signal indicator when the available duration is overshot.

2. The management system as claimed in claim 1, wherein the message, which is transmittable by the alarm signal service to the operator station client, comprises information about a criticality of the alarm signal.

3. The management system as claimed in claim 1, wherein the message, which is transmittable by the alarm signal service to the operator station client, comprises information about an acknowledgement of the alarm signal which has already occurred.

4. The management system as claimed in claim 2, wherein the message, which is transmittable by the alarm signal service to the operator station client, comprises information about an acknowledgement of the alarm signal which has already occurred.

5. The management system as claimed in claim 1, wherein the limitation of the visual display of the alarm signal indicator consists of only displaying alarm signals which have a particular criticality.

6. The management system as claimed in claim 1, wherein the limitation of the visual display of the alarm signal indicator consists of only displaying unacknowledged alarm signals.

7. The management system as claimed in claim 1, wherein the management system is utilized to operate the technical facility.

8. The management system as claimed in claim 7, wherein the technical facility comprises a process or manufacturing facility.

9. The management system as claimed in claim 1, wherein the technical facility comprises a process or manufacturing facility.

10. A method for visually displaying a facility mimic diagram of a technical facility including an operator station server and an operator station client, the method comprising:

a) transferring the facility mimic diagram of the technical facility from the operator station server to the operator station client, the facility mimic diagram comprising an alarm signal indicator;
b) communicating, via a computer-implemented alarm signal service of the operator station server, when transferring the facility mimic diagram with the alarm signal indicator, a duration which the operator station client is allowed to expend for visually displaying the alarm signal indicator;
c) displaying, by the operator station client, the facility mimic diagram with the alarm signal indicator visually;
d) informing the operator station client about an emergence of a new or updated alarm signal in the management system via a message by the alarm signal service;
e) determining via the operator station client which value an actual display time has for visually displaying the alarm signal indicator;
f) determining via the operator station client whether a display time for the visual display of the alarm signal indicator with the new or updated alarm signal would overshoot the value of the duration which the operator station client is allowed to apply for visually displaying the alarm signal indicator; and
g) limiting the visual display of the alarm signal indicator by the operator station client when the available duration is overshot.

11. The method as claimed in claim 10, wherein the message, which is transmitted by the alarm signal service in method step e to the operator station client, comprises information about a criticality of the alarm signal.

12. The method as claimed in claim 10, wherein the message, which is transmitted by the alarm signal service in method step to the operator station client, comprises information about an acknowledgement of the alarm signal that has already occurred.

13. The method as claimed in claim 11, wherein the message, which is transmitted by the alarm signal service in method step to the operator station client, comprises information about an acknowledgement of the alarm signal that has already occurred.

14. The method as claimed in claim 10, wherein the limitation of the visual display of the alarm signal indicator consists of only displaying alarm signals which have a particular criticality.

15. The method as claimed in claim 11, wherein the limitation of the visual display of the alarm signal indicator consists of only displaying alarm signals which have a particular criticality.

16. The method as claimed in claim 12, wherein the limitation of the visual display of the alarm signal indicator consists of only displaying alarm signals which have a particular criticality.

17. The method as claimed in claim 10, wherein the limitation of the visual display of the alarm signal indicator consists of only displaying unacknowledged alarm signals.

18. The method as claimed in claim 10, wherein the technical facility comprises a process or manufacturing facility.

* * * * *